(12) United States Patent
Boyd et al.

(10) Patent No.: X4143
(45) Date of Patent: Jun. 7, 1825

(54) THRASHING MACHINE( BALLOU'S IMPRVMT

(76) Inventors: John C. Boyd; Andrew Kitchin

John C Boyd and Andrew Kitchin
Letters Patent.

The Schedule referred to in these Letters Patent and making part of the
same containing a description in the words of the said John C Boyd and
Andrew Kitchin themselves of their improvement on Seth Ballou's
Thrashing machine.

Our improvement on Seth Ballou's Thrashing machine, which must
be considered the basis of this invention consists in having a concave of a
semi circular form, instead of a flat one, whereby the grain after hav
ing passed under the breaking or thrashing cylinder is guided round
down to the seive, riddle, or separator, instead of being obstructed
in its progress or passage and causing it to have a tendency to go
back to the point from whence it came. And likewise a [illegible] greater
improvement our seive, riddle, or separator hung in the usual man
ner is constructed with a wooden frame inside of which, made of
sheet iron or tin, is out the riddle. That part which is nearest to
the thrashing machine, about 1/4 of its length is without holes, for
the purpose of acting as a guide or way to the straw, and grain to pre
vent its falling through on account of its perpendicular descent, before
the chaff is separated from it. The holes can be round or square:
round we deem the best, and their jagged [illegible] downwards. Exd.

Witnesses
C. H. W. Wharton
Ol. A Elliot

John C Boyd
Andrew Kitchin

W.H.

DRAFTSMAN'S DIVISION.

*All communications should be addressed to*
"The Commissioner of Patents.
Washington, D. C."

2—328 a.

*DEPARTMENT OF THE INTERIOR,*

United States Patent Office,

*Washington, D. C.,* ............, 189...

*SIR:*

*The printed* copies *of Patent No.* Boyd & Kitchin
are *exhausted.* June 5, 1825

*As soon as printed a copy will be mailed you to complete your order.*

*By direction of the Commissioner:*

*Very respectfully,*

*Chief Clerk.*

3143b6-97-5m